US011238077B2

(12) United States Patent
Ramakrishna et al.

(10) Patent No.: US 11,238,077 B2
(45) Date of Patent: Feb. 1, 2022

(54) AUTO DERIVATION OF SUMMARY DATA USING MACHINE LEARNING

(71) Applicant: SAP SE, Walldorf (DE)

(72) Inventors: Panish Ramakrishna, Bangalore (IN); Ashutosh Patel, Bangalore (IN); Nithya Rajagopalan, Bangalore (IN)

(73) Assignee: SAP SE, Walldorf (DE)

( * ) Notice: Subject to any disclaimer, the term of this patent is extended or adjusted under 35 U.S.C. 154(b) by 190 days.

(21) Appl. No.: 16/425,736

(22) Filed: May 29, 2019

(65) Prior Publication Data

US 2020/0380022 A1 Dec. 3, 2020

(51) Int. Cl.
*G06F 7/00* (2006.01)
*G06F 16/34* (2019.01)
*G06Q 10/06* (2012.01)
*G06N 20/00* (2019.01)
*G06F 16/35* (2019.01)
*G06F 16/9535* (2019.01)
*G06F 16/31* (2019.01)

(52) U.S. Cl.
CPC .......... *G06F 16/345* (2019.01); *G06F 16/328* (2019.01); *G06F 16/355* (2019.01); *G06F 16/9535* (2019.01); *G06N 20/00* (2019.01); *G06Q 10/06315* (2013.01); *G06Q 10/06375* (2013.01)

(58) Field of Classification Search
CPC .. G06F 16/355; G06F 16/9535; G06F 16/345; G06F 16/328; G06F 16/739; G06F 16/254; G06F 16/248; G06Q 10/06315; G06Q 10/06375; G06N 20/00
See application file for complete search history.

(56) References Cited

U.S. PATENT DOCUMENTS

| | | | | |
|---|---|---|---|---|
| 7,418,431 | B1 * | 8/2008 | Nies | G06F 16/972 |
| | | | | 706/21 |
| 7,483,842 | B1 * | 1/2009 | Fung | G06Q 30/02 |
| | | | | 705/7.14 |
| 9,297,723 | B1 * | 3/2016 | Hofmann | G06N 20/00 |
| 10,318,874 | B1 * | 6/2019 | Duncan | G06N 20/20 |
| 10,467,550 | B1 * | 11/2019 | Gupta | G06Q 30/02 |
| 10,616,274 | B1 * | 4/2020 | Chang | G06N 3/02 |
| 10,748,072 | B1 * | 8/2020 | Seeger | G06N 7/005 |
| 2004/0111344 | A1 * | 6/2004 | Fetter | G06Q 40/02 |
| | | | | 705/35 |
| 2007/0106711 | A1 * | 5/2007 | Buros | G06F 16/254 |
| 2011/0004622 | A1 * | 1/2011 | Marson | G06Q 10/06 |
| | | | | 707/770 |

(Continued)

*Primary Examiner* — Mohammed R Uddin
(74) *Attorney, Agent, or Firm* — Schwegman Lundberg & Woessner, P.A.

(57) ABSTRACT

A method of processing raw data as it is received from a data provider via an input channel is disclosed. Values are derived from the raw data as it is received from the data provider via the input channel. The derived values correspond to custom fields of a summary table. The summary table is configured to store a summary of the raw data. The custom fields correspond to data capable of improving an analysis of an entity by an analysis tool. The derived values are inserted into the custom fields of the summary table. Access to the summary table is provided as enriched data for use by the analysis tool to improve the analysis of the entity.

20 Claims, 10 Drawing Sheets

(56) References Cited

U.S. PATENT DOCUMENTS

| | | | |
|---|---|---|---|
| 2011/0020777 A1* | 1/2011 | Hughes | G06Q 30/02 |
| | | | 434/235 |
| 2011/0166883 A1* | 7/2011 | Palmer | G16H 40/20 |
| | | | 705/3 |
| 2011/0173093 A1* | 7/2011 | Psota | G06Q 30/06 |
| | | | 705/26.35 |
| 2014/0258032 A1* | 9/2014 | Psota | G06Q 30/0609 |
| | | | 705/26.35 |
| 2015/0066861 A1* | 3/2015 | Ritto | G06F 16/21 |
| | | | 707/661 |
| 2015/0073929 A1* | 3/2015 | Psota | G06Q 30/0241 |
| | | | 705/26.2 |
| 2016/0055427 A1* | 2/2016 | Adjaoute | G06Q 30/0201 |
| | | | 706/12 |
| 2017/0220938 A1* | 8/2017 | Sainani | G06F 16/2471 |
| 2017/0223030 A1* | 8/2017 | Merza | H04L 63/1416 |
| 2018/0027006 A1* | 1/2018 | Zimmermann | G06F 9/46 |
| | | | 726/11 |
| 2018/0032862 A1* | 2/2018 | Oliner | G06N 3/0445 |
| 2018/0262864 A1* | 9/2018 | Reynolds | G06F 21/6245 |
| 2018/0268307 A1* | 9/2018 | Kobayashi | G06N 7/005 |
| 2019/0156198 A1* | 5/2019 | Mars | G06N 20/20 |
| 2020/0026710 A1* | 1/2020 | Przada | G06F 16/254 |

\* cited by examiner

DATA FILES

UPLOAD DATA FILES, VIEW DETAILS AND VALIDATION RESULTS, AND ADD DATA FILES TO LOAD OPERATIONS.

FILENAME: [_____]   TIME UPLOADED: [LAST ONE MONTH ˅]   FROM: 2/1/2019 TO: 3/14/2019

SOURCE SYSTEM: [ALL ˅]   DATA TYPE: [ALL ˅]

UPLOADED BY: [ALL ˅]   STATES: [ALL ˅]

SHOW SOURCE SYSTEMS WITH ☐
NO UPLOADED FILES:

[SEARCH] [RESET]   [UPLOAD NEW DATA FILE] [VIEW REALM FILES]

UPLOADED FILES

| ☐ | NAME | VALIDATION STATUS | SIZE | LINES | SOURCE SYSTEM | UPLOADED BY | UPLOADED TIME | LAST LOAD |
|---|---|---|---|---|---|---|---|---|
| ☐ | INVOICEDE_RESPONSE834.CSV | 0,2,4,0 | 848 KB | 1906 | DEFAULT | | 2/14/2019 1:23 PM | |
| ☐ | INVOICEDE_RESPONSE834.CSV | 0,2,4,0 | 848 KB | 1906 | DEFAULT | | 2/14/2019 1:23 PM | |
| ☐ | INVOICEDE_RESPONSE824.CSV | 0,2,4,0 | 863 KB | 1913 | DEFAULT | | 2/7/2019 12:28 PM | |
| ☑ | ENTITYE_RESPONSE823.ZIP | 0,0,9,0 | 89 KB | 1144 | DEFAULT | | 2/7/2019 11:48 AM | ENTITYE RESPONSELOAD |
| ☐ | DATA.CSV | 0,0,3,0 | 851 KB | 915 | | | | ENTITYDE RESPONSELOAD |
| ☐ | DIVINFO.CSV | 0,0,3,0 | 17 KB | 221 | | | | ENTITYDE RESPONSELOAD |
| ☐ | GREENINFO.CSV | 0,0,3,0 | 1 KB | 8 | | | | ENTITYDE RESPONSELOAD |

[ADD TO LOAD OPERATION] [DELETE]

AUTO DERIVATION OF SUMMARY DATA USING MACHINE LEARNING

TECHNICAL FIELD

The present disclosure generally relates to analyzing entity data and, in one specific example, to generating a summary table from raw entity data as it is received from one or more data providers to support more efficient, complete, and accurate analysis of entities, such as analysis related to connecting entities based on diversity characteristics (e.g., with respect to gender or ethnicity).

BRIEF DESCRIPTION OF THE DRAWINGS

FIG. 9 is a screenshot of an example user interface for viewing more details about an entity from within an analysis tool.

DETAILED DESCRIPTION

Figure 1:
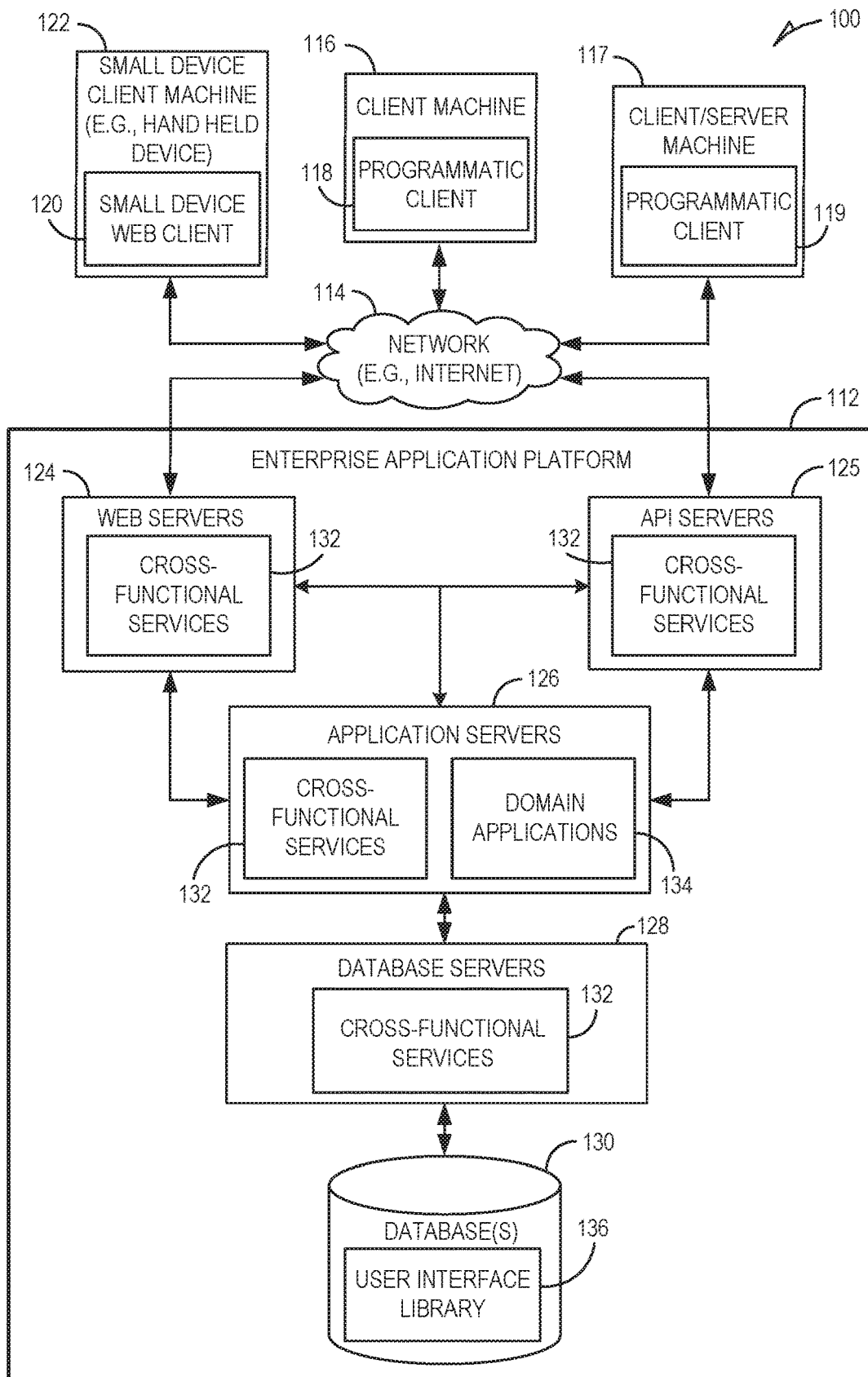
FIG. 1 is a network diagram illustrating a client-server system, in accordance with some example embodiments.

In the following description, for purposes of explanation, numerous specific details are set forth in order to provide an understanding of example embodiments of the present subject matter. It will be evident, however, to those skilled in the art that example embodiments may be practiced without these specific details.

Despite having access to a variety data sources, including data providers and databases, such as those containing raw data pertaining to an entity (e.g., raw data pertaining to industry, location, size, stability, risk, socio-economic classification, small-business indicators, corporate family tree, risk conditions (such as political, economic, external, commercial, trade environment risks), business profiles, financial indicators, corporate linkage, competitive landscape, predictive risk scores, legal proceedings, government watch or control lists, financial statements, disasters, payment behavior, and so on), applications executing in a corporate environment, including cloud-based systems, may not be configured to find or manage diverse entities in an efficient manner. For example, system-compatibility issues may present challenges for buyer entities, including with respect to meeting certain diversity goals or requirements. Similarly, some entities, such as smaller entities, may have systems that are not configured to unlock opportunities with larger entities, despite their ability to help the larger entities meet their goals, such as goals pertaining to engaging with small, minority-owned sellers. Systems that are configured to help buyers discover and connect with diverse entities can not only provide a significant technological improvement over existing systems, especially with respect to resolving compatibility issues, but also open the door to new relationships and business opportunities for various entities. In some example embodiments, at least one of the entities may be a supplier.

Diversity isn't just a good business practice. Studies show it's actually good for business. For example, some research finds that companies in the top quartile for gender or racial and ethnic diversity are more likely to have financial returns above their national industry medians. Diversity may be a competitive differentiator that shifts market share toward more diverse companies over time. However, configuring systems to handle raw data relevant to diversity characteristics of entities in a compatible and efficient manner has been a challenging problem.

A data enrichment platform may include a range of cloud-based applications designed to help companies achieve their goals, such as a goal of establishing or maintaining responsible and sustainable sourcing. A diversity database, for instance, may allow companies to easily search for a certified, diverse entity by location, certifying agency, diversity classification, and more. Integrating such applications with business networks (e.g., SAP Ariba Network) and corresponding tools, such as spend management tools (e.g., SAP Ariba), can help entities (e.g., from more than 2.5 million companies and 190 countries) discover new opportunities, collaborate on transactions, and grow their relationships. Buyers can manage the entire purchasing process, while controlling spending, finding new sources of savings, and building a healthy supply chain. And entities can connect with profitable customers and efficiently scale existing relationships—simplifying sales cycles and improving cash control along the way—while at the same time satisfying any internal or external diversity requirements pertaining to sourcing. The result is enhancement of a dynamic, digital marketplace, where trillions in commerce can get done every year.

In example embodiments. RFP, RFQ and RFI events may be opened to a wider pool of minority-, woman-, LGBT- and veteran-owned businesses, enabling global supply chains to become more responsible, sustainable and inclusive.

In example embodiments, diversity data is derived from raw data received from one or more data providers, such as Dun & Bradstreet. The diversity data is aggregated from raw data based on one or more machine-learned models and a set of linked handlers corresponding to custom fields of a summary table. The machine-learned model is trained based on historical data that matches the diversity data previously added to or included in the custom fields of the summary table. In example embodiments, the custom fields are extra fields of the summary table (e.g., fields that go beyond standard fields of the summary table) that align with the organization's diversity goals and/or requirements of the front-end tools used to access the raw data, including content and formatting requirements.

In example embodiments, each of the custom fields may be associated with one or more handlers, which may be linked together (e.g., sequentially or otherwise), for aggregating values included in the raw data for inclusion in a summary database or table. The aggregation may be performed according to machine-learned models associated with the handlers and performed as the raw data is received from one or more data providers. The aggregated values may be stored in one or more fields of a summary database or table, such as one or more custom fields. This process results in a summary table is more efficiently generated (e.g., by application of the handlers as data is received) than it would be through other means (e.g., by post-processing of raw data that has been distributed across multiple databases or tables of an organization). The summary table allows front-end tools of an organization to more easily access and consume diversity data pertaining to entities than through other means because, for example, relevant values have already been calculated and/or aggregated for inclusion in a single (e.g., indexed) database or table. The values are pre-populated into fields that are customized to meet the requirements set forth by the organization (e.g., through machine-learning applied to the front-end tools). As such, the values accessed or consumed by the front-end tools for the purpose of finding or managing diverse entities do not require further calculating or processing. As a result, the organization can more efficiently find or manage entities (e.g., via the front-end tools) according to one or more diversity criteria (e.g., woman-owned business, veteran-owned business, and so on).

A method of processing raw data as it is received from a data provider via an input channel is disclosed. In example embodiments, the raw data corresponds to one or more entities. Values are derived from the raw data as it is received from the data provider via the input channel. The derived values correspond to custom fields of a summary table. The summary table is configured to store a summary of the raw data. The custom fields correspond to data capable of improving an analysis of an entity by an analysis tool. The derived values are inserted into the custom fields of the summary table. Access to the summary table is provided as enriched data for use by the analysis tool to improve the analysis of the entity.

This method and example embodiments disclosed herein may be implemented by a specially-configured computer system. The computer system may be specially configured by one or more modules (e.g., hardware modules or software modules) and implemented by one or more computer processors of the computer system. This method and example embodiments disclosed herein may be embodied as instructions stored on a machine-readable medium that, when executed by one or more processors of a computer system, cause the computer system to perform one or more of the operations described herein. These operations are asserted to be non-routine or unconventional operations either individually or in combination.

The details of one or more variations of the subject matter described herein are set forth in the accompanying drawings and the description below. Other features and benefits of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
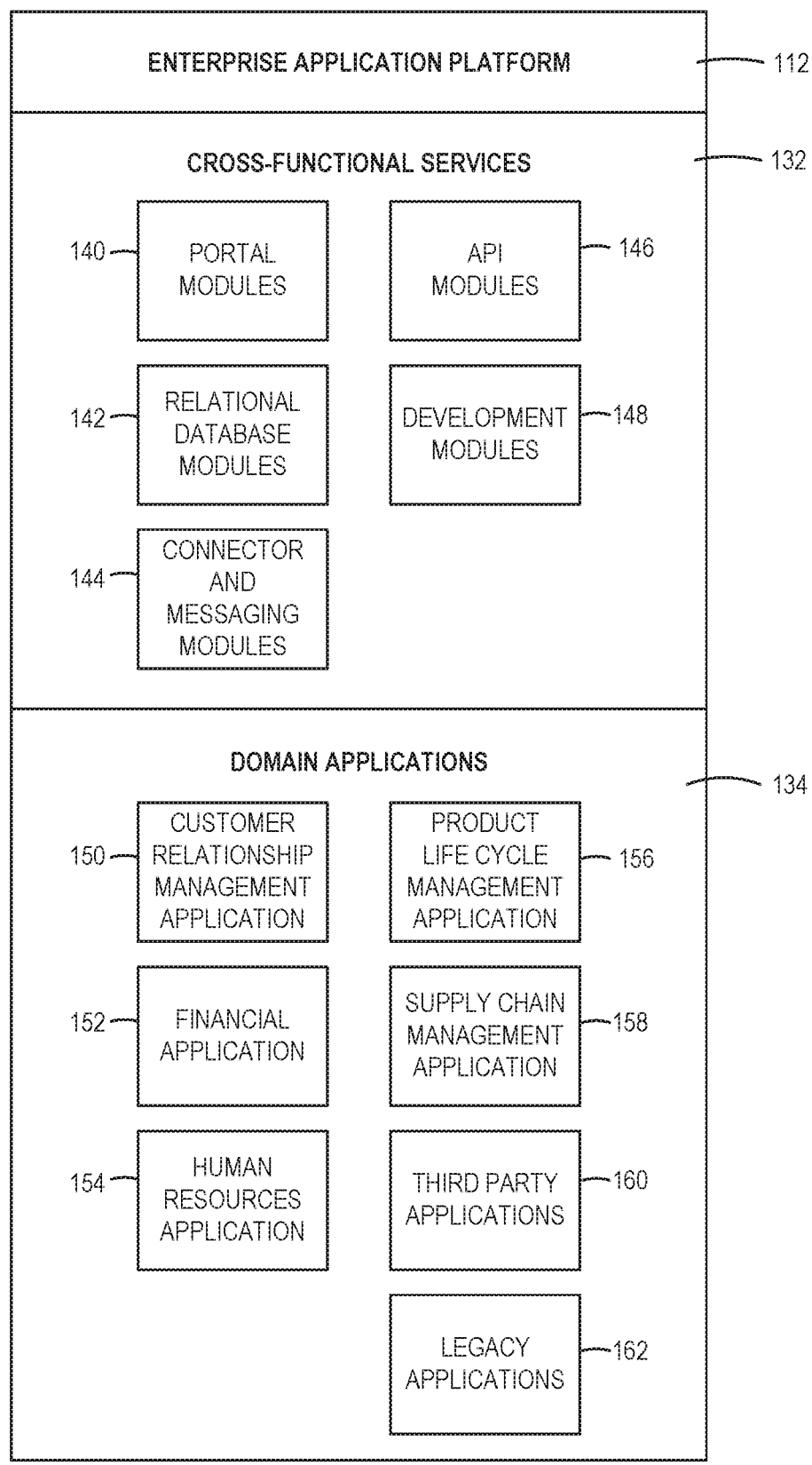
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
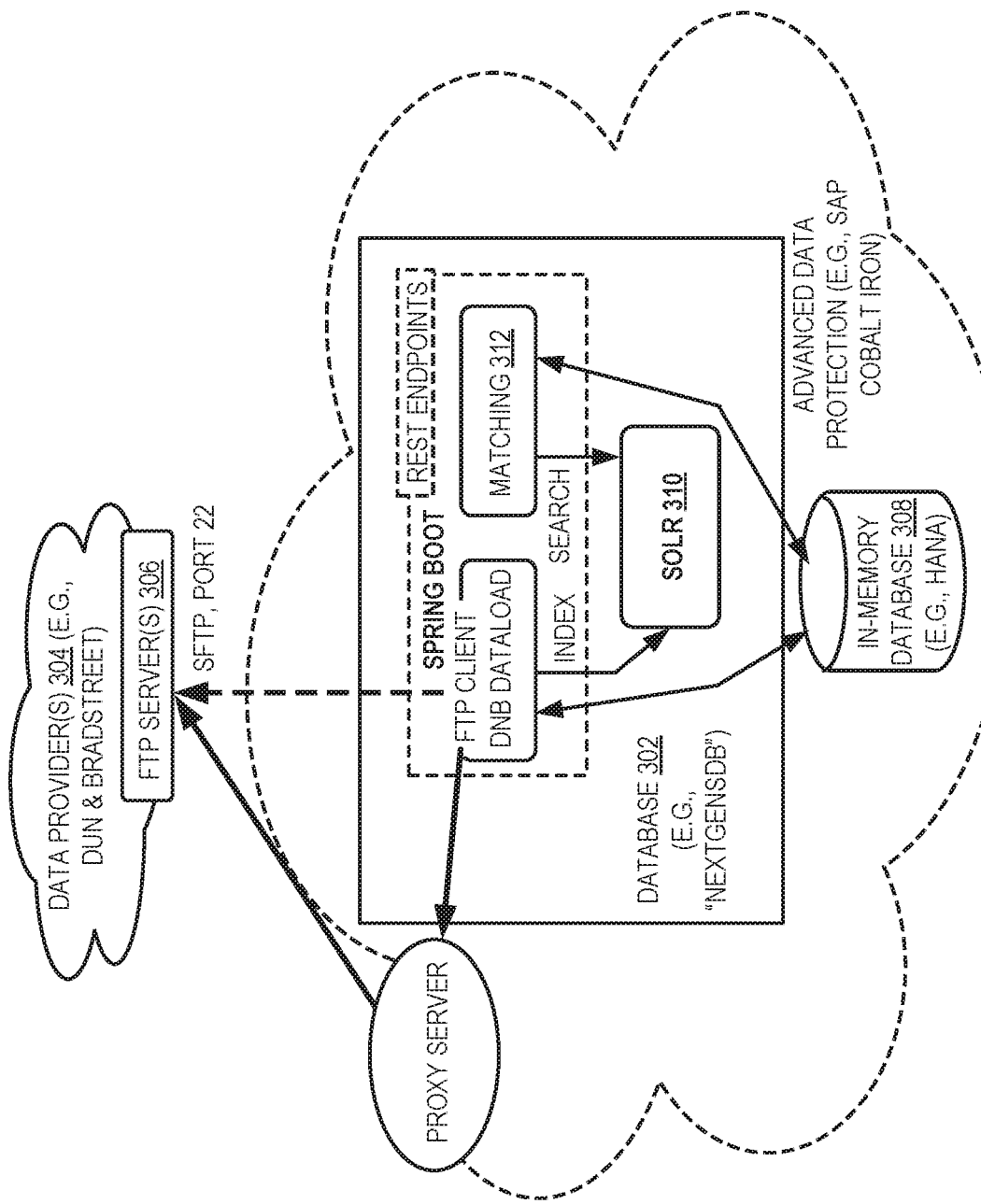
FIG. 3 is block diagram of an example architecture for implementing auto-derivation of summary data from raw data.

FIG. 3 is block diagram of an example architecture for implementing auto-derivation of summary data from raw data. In example embodiments, database 302 (e.g., "NextGen SDB") is a master repository of entities (e.g., hundreds of millions of entities). In some example embodiments, one or more of the entities may be suppliers. The raw data is sourced from one or more data providers 304 (e.g., Dun & Bradstreet). The information includes hundreds of attributes for each entity, including, for example, entity name, address, parentage, risk information, financial information, diversity certificates, green, merger, alternate linkage, and so on. This entity information is used by one more tools, including tools for performing entity matching (e.g., based on diversity criteria), enrichment of data with respect to spend visibility, or enrichment of data pertaining to entity risk (e.g., as analyzed in a separate tool, such as SAP Ariba).

In example embodiments, the one or more data providers 304 send periodic (e.g., monthly) delta updates to the entity data (e.g., for storage in database 302). In example embodiments, the delta updates are provided by posting of compressed CSV files on one or more FTP servers 306 of the one or more data providers 304. In example embodiments, at another periodicity (e.g., annually), the one or more providers 304 may send full files (e.g., information on all entities in their databases (e.g., every September)). The sizes of the delta files may be relatively small (e.g., for approximately 40-80 million records, the sizes may be 7-10 GB, optionally split across multiple files of approximately 600 MB each), whereas the sizes of full files may be relatively large (e.g., for approximately 300 million records, the sizes may be 30 GB, optionally split across multiple files of approximately 600 MB each).

In example embodiments, the NextGen SDB 302 may aggregate data from two master databases in the cloud (e.g., for an analysis tool, such as Ariba Cloud): 1. SDB 2. MDR. Here, the SDB supports Spend Analysis enrichment and the MDR supports Risk Enrichment. Both databases may load data from the same one or more data providers 304; therefore, consolidation may eliminate operational redundancy of loading two separate databases. Additional benefits of consolidation may include: (1) getting the analysis tools one step closer to having a centralized database for all enrichment needs, (2) enabling a common link between Enriched Spend Analysis and other Enriched Upstream solutions (3) improved performance with a database platform (e.g., an in-memory database 308, such as SAP HANA), (4) streamlining operations, and (5) resolving parent name normalization issues (e.g., having multiple parent names for a same ID).

In example embodiments, the SDB 302 has a data provider file processing component and a matching component. The file processing component breaks file processing into multiple small steps, including, for example, file download, file extract, staging, merging, indexing, and post processing. All of these steps may be modelled as steps within a State Machine. The State Machine jumps from one step to the next. In example embodiments, the data from the one or more data providers will be provided in different files, such as files labeled by data type, such as core data (e.g., name, address, and so on), green data (e.g., green image, green manufacturing, green design, recycling system, green certification, environmental costs, control of pollutant emissions, social responsibility, clean production, green process management, and so on), delete data, risk data (e.g., stability indicator, evaluation risk, economic stability, production process flexibility, just in time implementation, business experience, previous contracts, employee capacity, problem solving capacity, and so on), Altlnk data, Bemfab data (e.g., activity data, such as marketable, not matches, possibly out of business, or undeliverable name and address combination), and so on. In example embodiments, there is a file processor for each type of file, which parses the file and dumps the results into temporary table. The data in the table is transformed and merged into a corresponding 'Raw' table (e.g., for each organization). Then, a post-processing script may extract summary/rollup columns for data relevant to improving analysis performed by an analysis tool, including, for example, whether the organization is minority owned, women owned, and so on. Data is refreshed in summary tables like an Organization Summary table. The Organization Summary table may hold all the Enrichment Data related to the entity along with parentage and rollup attributes. Diversity Certificates related to each entity may be processed and stored in a Diversity Certificates table. As part of file processing, the data may be indexed into a "SOLR" 310 component for entity matching via a matching 312 component). A REST end point may be provided to expose an organization and its attributes to other systems or modules. Even functionality of the matching component 312 may be exposed as REST endpoint.

In example embodiments, search results for entity matching are improved. A customer's raw data may have mostly partial name and its location information. Sometimes some of the location information, like street address, is wrong or sometimes city and postal code are not in sync or wrong. There are many such issues with the raw data.

Direct querying of the SOLR 310 component or databases 302 or 308 with these raw fields often does not give the best possible set of search results. A lot of the time, such direct querying leads to a non-optimal match or a non-match, even when a correct entity exists in the database 302 or in-memory database 308.

The following strategies are used to contribute to better search candidates.

1. Normalization: Custom normalization is performed, which yields better keywords for searching. The raw data is first cleansed and then normalized and synonyms and stop words are handled. Cleansing involves handling punctuations, removal of special characters, handling of initials, collapsing canonical tokens, special handling of numbers and parenthesis.

2. Name normalization: This involves handling exceptional patterns in entity name, removing noise suffixes, trailing numerical, handling abbreviations, removal of company forms and locations from name. Also, minimal stemming is performed, which may improve the results.

3. Keyword identification: Each word in the name is tagged—e.g., as significant, regular, frequent, or noise. Then significant and regular words are added to the keyword list. If there are not enough keywords, then a first frequent word is added to the keyword list. If still not enough keywords are present, a noise word with least frequency is used. These keywords are later used in a query and given higher weightage. In this way, the search results are improved significantly.

4. Multidimensional: Entity matching is performed based on different features like entity name, street address, city, postal code, state, or country. Each feature can be individually turned on or off dynamically while searching. For example, even if a street address is provided, and it is junk data, then that column can be ignored while matching. Therefore, instead of always considering all columns, a column with irrelevant data is ignored such that it does not throw off the results.

In example embodiments, the architecture is a pure cloud solution built on a cloud platform (e.g., SAP Cloud Platform (SCP)). The architectural style may be based on the micro services methodology. At least some of the external data (e.g., less frequently-changed data) may be persisted inside the cloud platform (e.g., in a central database, such as databases 302 or 308). Other external data (e.g., highly-volatile data, like credit score, risk score, or stock process data) may be fetched in real-time form one or more data providers. In example embodiments, each type of external data (e.g., highly-volatile or less-volatile) may be handled by a different microservice of a plurality of microservices. The data may then be transformed (e.g., from a data format supported by the data providers into a data format supported by one or more of the applications) and passed onto the consumers (e.g., using additional microservices of the plurality of microservices). The platform may thus offer availability of business intelligence solutions or DaaS for any enterprise application. Certain applications may include pre-wired integration, including harmonized relationship views (e.g., within user interfaces of the applications) of the data items, whether they are external data items, master data items, or both. In example embodiments, an application center (e.g., SAP App Center) may be used as a sales channel in an agent-based business model.

In example embodiments, each data provider or each data point may be associated with a one or more microservices at the architectural level. Consumers may then access particular data points within each of the datasets using the corresponding microservices. This use of microservices can contribute to a reduction in TCO associated with accessing data across different or separate computer processes deployed within different or separate lines of business of an organization, including computerized processes associated with any combination of the example applications discussed above. In other words, the use of microservices is one aspect of the disclosed architecture that leads to more optimal use of processor power, memory, or bandwidth resources for data brokerage needs of an organization. Additionally, as discussed herein, the central deployment of the microservices is another aspect that contributes to such optimizations (e.g., through the elimination of one-to-many provider-to-consumer model).

Figure 4:
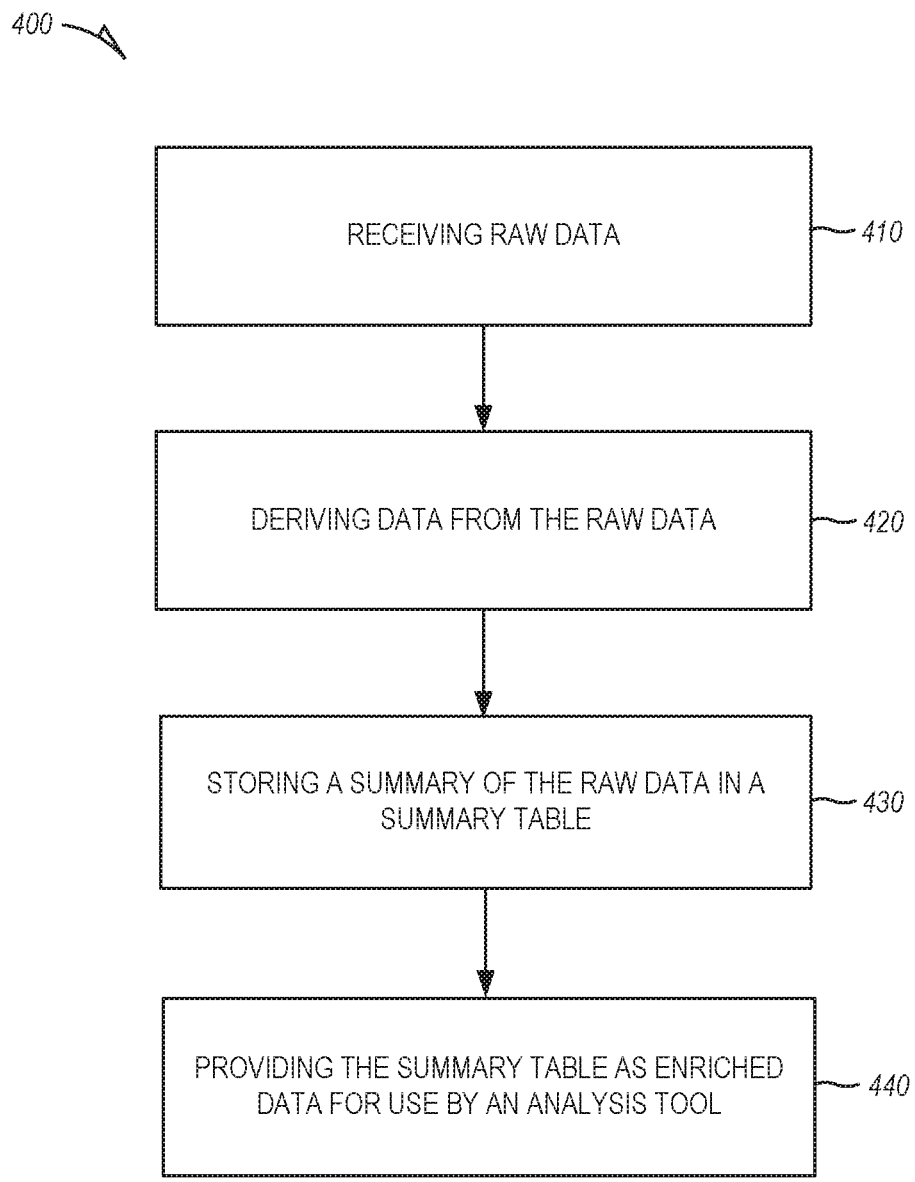
FIG. 4 is a flowchart of an example method of processing raw data.

FIG. 4 is a flowchart of an example method 400 of processing raw entity data.

At operation 410, raw entity data is accessed (e.g., via FTP, as discussed above) at one or more data providers or received from one or more data providers.

The incoming data may have fields like "ID" or "Display name," In example embodiments, this data is filled into a summary table. Also, custom fields apart from the ones in the input are filled in. These custom fields may be extra fields that are identified, selected, or defined based on machine-learning applied to historical input data or in specified requests or requirements of an analysis tool that uses the input data.

At operation 420, data is derived from the raw entity data that corresponds to custom fields in the summary table.

In example embodiments, the raw entity data is huge; therefore, running post processing scripts or tools may be a poor option in terms of efficiency, performance, or resource utilization (e.g., of processing power, memory, or bandwidth) requirements. Therefore, any post processing, including adding of the custom fields (e.g., columns corresponding to values derived from incoming data), may occur before inserting of the data into the summary table.

For example, consider the following incoming data:

ID, DisplayName, EntityName, EntityAddress1, EntityAddress2, 1, "Motor", "Magnificent Motor Provider", "7 23, 45 Avenue", "California, US"

Here are the data fields that are inserted into the summary table:

ID, DisplayName, EntityName, EntityAddress1, EntityAddress2, DerivedEncodedID, DerivedEntityType, DerivedEntityQuality, DerivedFullEntityAddress, ERPCommodityCode.

And here are the values for those data fields:

1, "Motor", "Magnificent Motor Provider", "7 23, 45 Avenue", "California, US", 0x0O1, "Motor Supplier", "Good", "7 23, 45 Avenue California, US", 123

Here, different handlers are used to derive the custom fields and corresponding values that are inserted into the summary table. In example embodiments, the handlers are linked and executed in a chain. Here are some exemplary handlers that may be used:

Derived Encoded ID—creates a hex encoded string.

DerivedEntityType—Display name and entity name is fed to a machine-learned model that derives the entity type based on past data and a natural language processing algorithm, such as a "bag of words" algorithm.

DerivedEntityAddress—ConcatenationHandler is used to join multiple raw data values.

In example embodiments, the configuration of the handlers, the order of the handlers, and the type of handlers used are derived from meta data (e.g., XML-based metadata) associated with the summary table.

At operation 430, the summary of the raw entity data, including the derived values, is stored in a summary table, which may, in turn, be indexed to enable efficient matching, as described above.

At operation 440, the summary data is provided as enriched entity data for use by an analysis tool, such as a tool for matching entities based on diversity criteria or other requirements of the entities.

Figure 5:
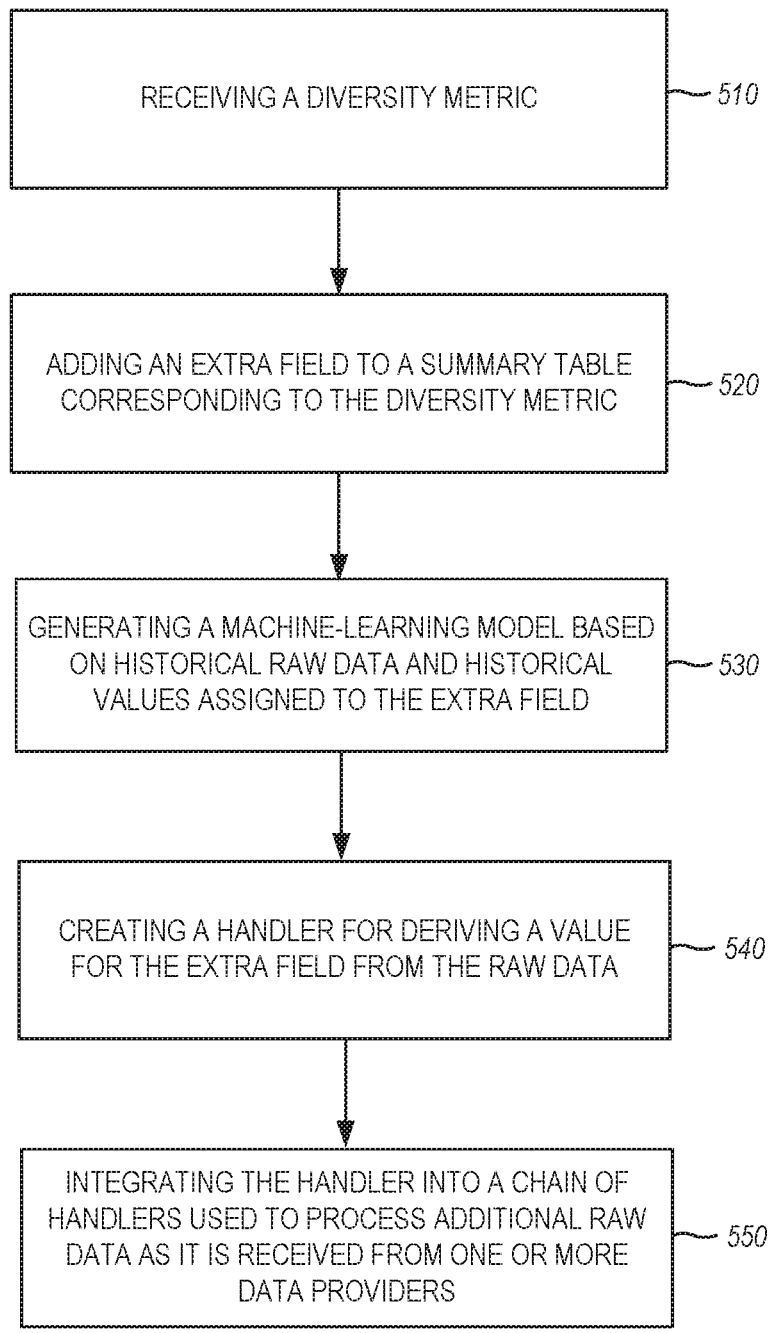
FIG. 5 is a flowchart of an example method of using machine-learning to enrich raw data.

FIG. 5 is a flowchart of an example method 500 of using machine-learning to enrich raw entity data (e.g., with data used for matching entities based on diversity criteria or requirements). At example 510, a diversity metric is received, such as information pertaining to an organization's requirements or goals with respect to engaging diverse entities.

At operation 520, a custom field is added to a summary table corresponding to the diversity metric, such as a summary flag indicating whether an entity is a woman-owned, minority-owned, or veteran-owned business.

At operation 530, historical raw entity data and historical values assigned to the custom field are analyzed (e.g., over a particular time period). For example, a machine-learning model is trained based on the historical data to identify patterns in the raw data that indicate a true or false value for the summary flag represented by the custom field.

At operation 540, a handler for deriving a value for the custom field from the raw entity data is added to a set of handlers used for processing the raw entity data. In example embodiments, the handler identifies the machine-learning model and the inputs to the machine learning model. The output of the machine-learning model is used to determine the value for the summary field.

At operation 550, the set of handlers are used to process additional raw entity data as it is received from the one or more data providers. In example embodiments, the handlers are executed as a chain in an order specified by meta data associated with the summary table or processes for automatically deriving the summary data from the raw data.

Figure 6:
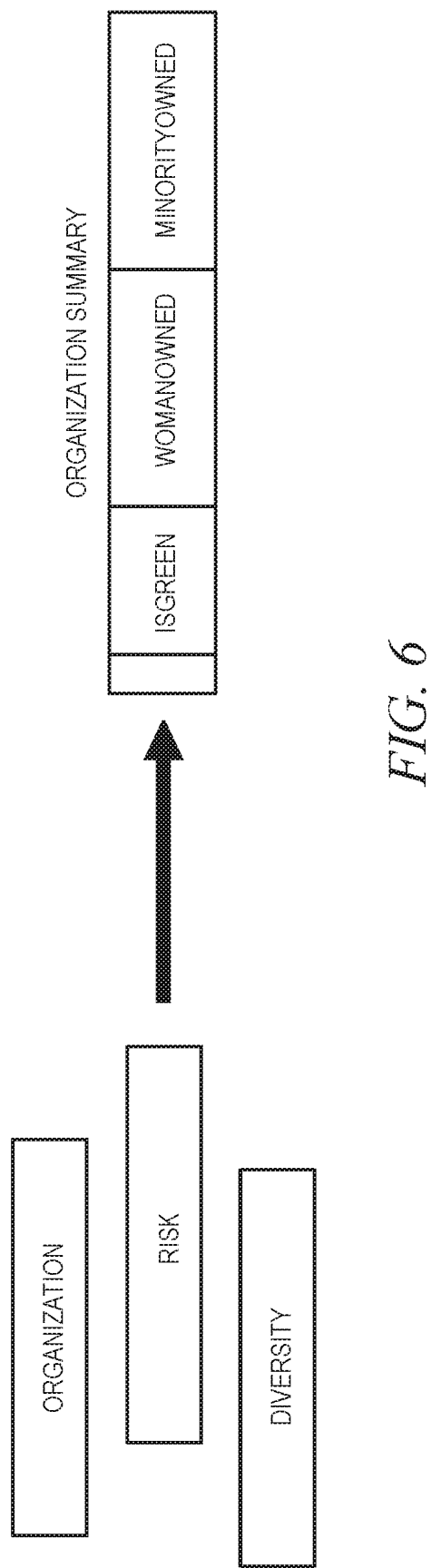
FIG. 6 is a block diagram depicting data summarization and normalization.

FIG. 6 is a block diagram depicting entity data summarization and normalization. In example embodiments, the data related to an entity and its diversity information, green information, or risk information will be provided in different files. To improve system efficiency and resource utilization for reporting and general querying, all these data values are normalized and formatted and stored. A summary table is created (e.g., called Organization_Summaty), which holds all data related to an entity. The green and diversity information for an organization may be in different tables or files. Summarization scripts will group and transform all (or a specifically-identified subset) of this information for a particular organization into a single record and insert the information into the summary table. The data from the summary table may then be exposed (e.g., through a REST interface) for other use cases (e.g., access or use by one or more analysis tools, such as a tool for matching entities, such as business organizations, based on diversity metrics).

In example embodiments, the raw data about an entity from one or more data providers will be split into different files and/or into different columns within the same file. Once the raw data is obtained, certain sets of scripts are executed to create a set of summary tables (e.g., in a HANA database) to process and store this data, including certificate information. The scripts are written to purge and recreate the summary so that the system has consistent and up-to-date data One or more SQL scripts may be used to do faster or more scalable database functions or procedures (e.g., via an in-memory database, such as SAP RANA) that speed up the summary and certificate extraction.

In this way, for example, raw certificate data from Dun & Bradstreet, which is originally-represented in a very denormalized fashion, goes through a transformation such that it is represented in a well-formatted and maintainable way (e.g., that is compatible with specified requirements of an organization or one or more front-end analysis tools used by the organization).

Figure 7:
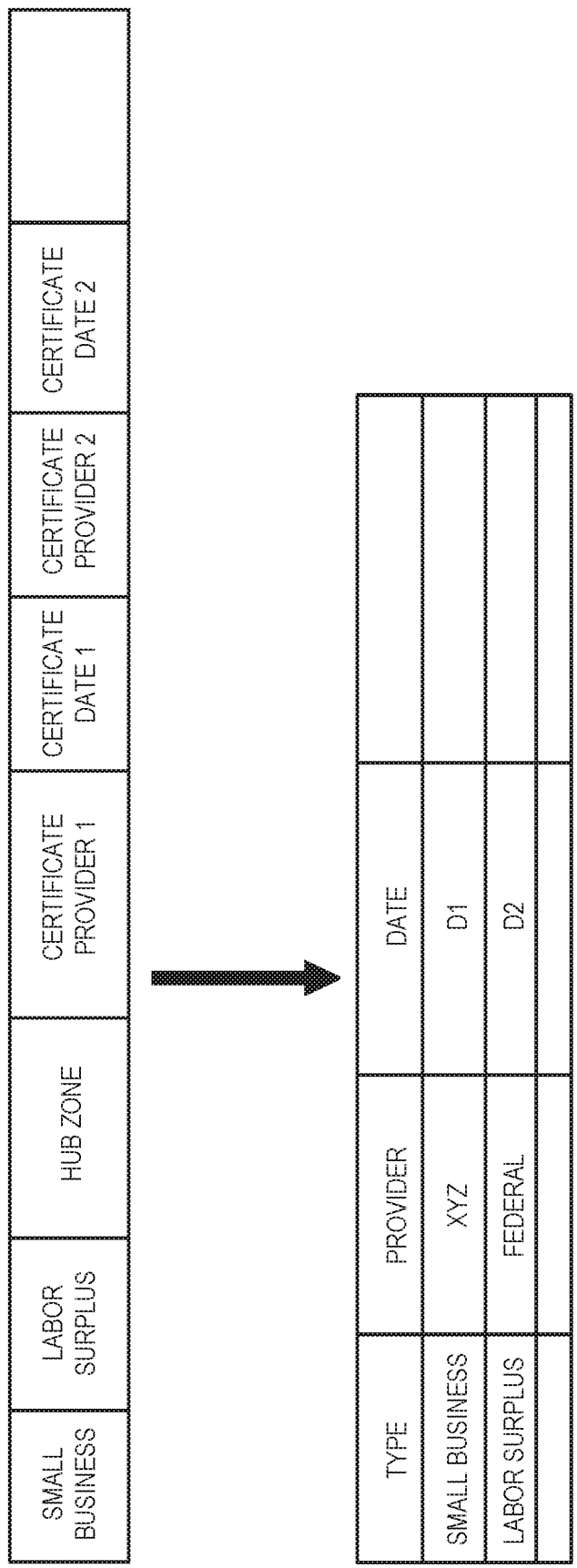
FIG. 7 is a block diagram depicting example header certificates processing.

FIG. 7 is a block diagram depicting example header certificates processing. The raw data pertaining to the entity may have some Super Flags indicating a few diversity certificates like Labor Surplus, Small Business, Flub Zone, etc. The related certificate information, like certification expiration date, certificate provider, etc., will be provided in a scalar format and normalized into different columns of a diversity table/file. For reporting all these certificates, A SQL procedure may be used to pull these 'Header' certificates and denormalize them into a 'Certificate' table that holds the data related to that certificate, like Certificate Type, provider, expiration date, etc.

Figure 8:
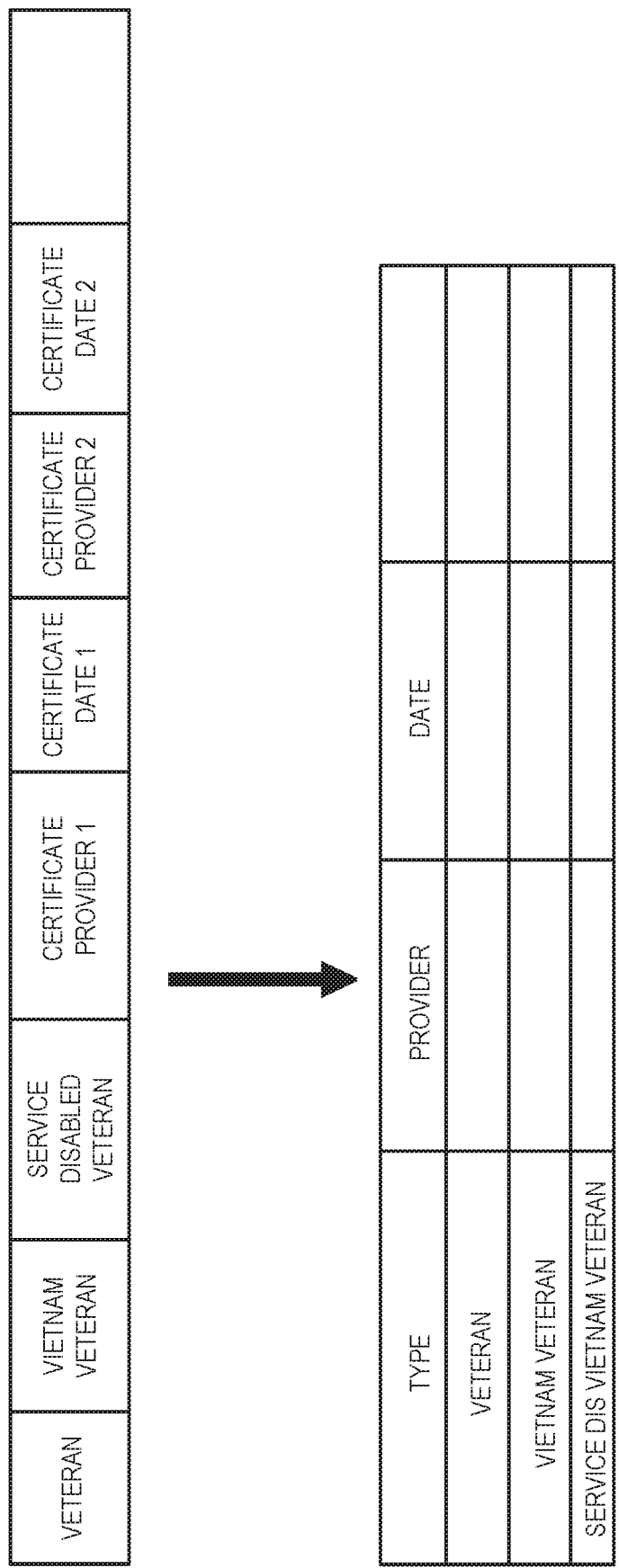
FIG. 8. is block diagram depicting certificate normalization.

FIG. 8. is block diagram depicting certificate normalization. The raw data about different entity certificates (e.g., from a data provider like D&B) may be provided in a scalar format and represented by different columns and flags. For example, a flag may represent 'Veteran Owned,' 'Vietnam Veteran' and/or 'Service Disabled Veteran.' Information related to a certificate, like certification expiration date or certificate provider, may be represented in few scalar columns like 'Veteran Certificate Provider'. 'Veteran Certification Date,' etc. Also, each organization may have one or more certificates the details of which may be represented by another set of scalar columns. For reporting, scalar transformation and grouping logic is executed to get the certificate information for all the combinations of the flags represented in the above example. For example, one of more certificate types and related data may be collected for all veteran combinations like the following:

(Vietnam) (veteran)
(Vietnam) (Service disabled) (veteran
(Service disabled) (veteran)
Just 'Veteran' header certificate.

The 'Certificate' table may be a denormalized structure with 'Certificate Type' and certificate attributes like 'provider', date, etc. The data from the denormalized Certificate table may then be exposed through a REST interface for other use cases e.g., for access and use by analysis tools).

FIG. 9 is a screenshot of an example user interface for viewing more details about an entity from within an analysis tool. In example embodiments, an administrator may access diversity information 902 about a particular entity from a set of data files corresponding to the entity. The diversity information 902 may include one or more values from the summary table, including values corresponding to flags pertaining to diversity goals or requirements of an organization. Thus, an administrator may not only be quickly apprised of spend data pertaining to each entity, but also up-to-date information about whether the entity is helping or continuing to help the organization meet its diversity goals.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 102) and via one or more appropriate interfaces (e.g., APIs).

Example embodiments may be implemented in digital electronic circuitry, or in computer hardware, firmware, or software, or in combinations of them. Example embodiments may be implemented using a computer program product (e.g., a computer program tangibly embodied in an information carrier, in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

EXAMPLES

1. A system comprising:
one or more computer processors;
one or more computer memories; and
a set of instructions incorporated into the one or more computer memories, the set of instructions configuring the one or more computer processors to perform operations for processing raw entity data as it is received from a data provider via an input channel, the operations comprising:
associating a handler for deriving derived data from the raw entity data for a custom field of a summary table;
invoking the handler, the invoking of the handler including providing at least a portion of the raw entity data as an input into the machine-learned model;
inserting a result of the invoking of the handler into the custom field of the summary table; and
providing access to the summary table as enriched entity data for use by an analysis tool to improve the analysis of the entity.

2. The system of example 1, wherein the operations further comprise accessing metadata that specifies a configuration for a set of handlers corresponding to a set of custom fields, the configuration including an order in which the set of handlers is to be executed and a type of each of the set of handlers that is to be used, the set of handlers including the handler.

3. The system of example 1 or example 2, wherein the metadata specifies, for at least one of the set of handlers, one or more inputs from the raw entity data that comprise the at least the portion of the raw data that is to be fed into the machine-learning model.

4. The system of examples 1-3, wherein at least one of the custom fields is an entity type field, the one or more inputs include a display name and an entity name, and wherein the machine-learned model returns a value corresponding to the entity type field based on the display name and the entity name.

5. The system of examples 1-4, wherein the processing of the raw data as it is received from the data provider is performed in lieu of post-processing of the raw data after it is received.

6. The system of examples 1-5, wherein the summary table aggregates data that is stored in separate files pertaining to at least two of diversity, green, or risk information corresponding to one or more entities.

7. The system of examples 1-6, wherein at least one of the custom fields corresponds to a rollup flag that signifies Whether each of the entities is certified as a woman-owned, veteran-owned, disadvantaged-owned, or minority-owned entity.

8. A method comprising:
processing, using one or more computer processors of an auto-derivation tool, raw data as it is received from a data provider via an input channel, the processing including:
deriving, using the one or more computer processors, values from the raw data as it is received from the data provider via the input channel, the derived values corresponding to custom fields of a summary table, the summary table configured to store a summary of the raw data, the custom fields corresponding to data capable of improving an analysis of an entity by an analysis tool;
inserting, using the one or more computer processors, the derived values into the custom fields of the summary table; and
providing, using the one or more computer processors, access to the summary table as enriched data for use by the analysis tool to improve the analysis of the entity.

9. The method of example 8, wherein the deriving of the values includes accessing metadata that specifies a configuration for a set of handlers corresponding to the custom fields, the configuration including an order in which the set of handlers is to be executed and a type of each of the set of handlers that is to be used.

10. The method of example 8 or example 9, wherein the metadata specifies, for at least one of the set of handlers, one or more inputs from the raw data that are to be fed into a machine-learning model.

11. The method of examples 8-10, wherein at least one of the custom fields is an entity type field, the one or more inputs include a display name and an entity name, and wherein the machine-learned model returns a value corresponding to the entity type field based on the display name and the entity name.

12. The method of examples 8-11, wherein the processing of the raw data as it is received from the data provider is performed in lieu of post-processing of the raw data after it is received.

13. The method of examples 8-12, wherein the summary table aggregates data that is stored in separate files pertaining to at least two of diversity, green, or risk information corresponding to the entity.

14. The method of examples 8-13, wherein at least one of the custom fields corresponds to a rollup flag that signifies whether an entity is certified as a woman-owned, veteran-owned, disadvantaged-owned, or minority-owned entity.

15. A non-transitory machine-readable medium storing instructions that, when executed by one or more computer processors, cause the one or more computer processors to perform operations comprising:
processing raw data as it is received from a data provider via an input channel, the processing including:
deriving values from the raw data as it is received from the data provider via the input channel, the derived values corresponding to custom fields of a summary table, the summary table configured to store a summary of the raw data, the custom fields corresponding to data capable of improving an analysis of an entity by an analysis tool;

inserting the derived values into the custom fields of the summary table; and providing access to the summary table as enriched data for use by the analysis tool to improve the analysis of the entity.

16. The non-transitory machine-readable medium of example 15, wherein the deriving of the values includes accessing metadata that specifies a configuration for a set of handlers corresponding to the custom fields, the configuration including an order in which the set of handlers is to be executed and a type of each of the set of handlers that is to be used.

17. The non-transitory machine-readable medium of example 15 or example 16, wherein the metadata specifies, for at least one of the set of handlers, one or more inputs from the raw data that are to be fed into a machine-learning model.

18. The non-transitory machine-readable medium of examples 15-17, wherein at least one of the custom fields is an entity type field, the one or more inputs include a display name and an entity name, and wherein the machine-learned model returns a value corresponding to the entity type field based on the display name and the entity name.

19. The non-transitory machine-readable medium of examples 15-18, wherein the processing of the raw data as it is received from the data provider is performed in lieu of post-processing of the raw data after it is received.

20. The non-transitory machine-readable medium of examples 15-19, wherein the summary table aggregates data that is stored in separate files pertaining to at least two of diversity, green, or risk information corresponding to the entity.

Figure 10:
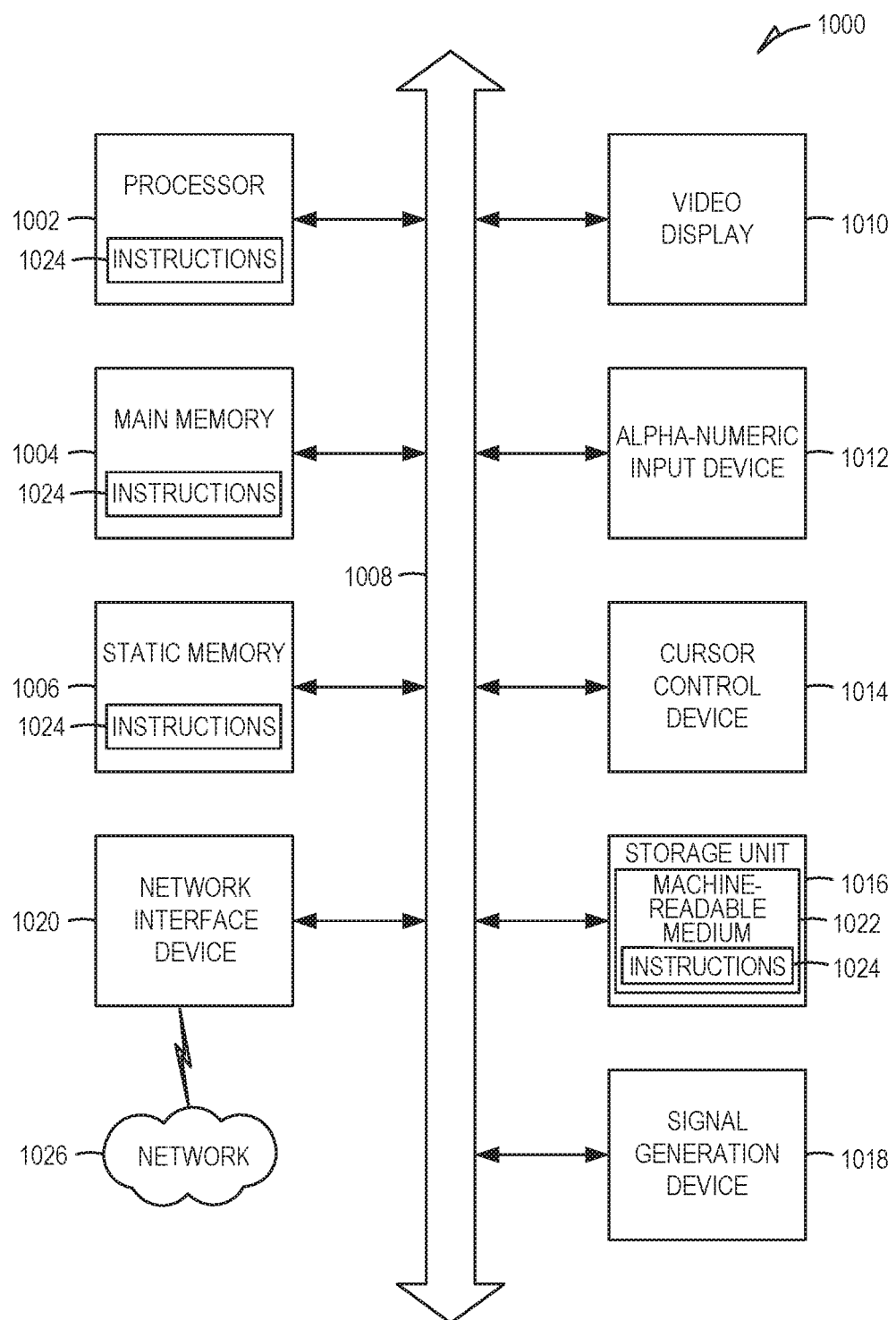
FIG. 10 is a block diagram of a machine in the example form of a computer system within which instructions for causing the machine to perform any one or more of the operations or methodologies discussed herein may be executed.

FIG. 10 is a block diagram of machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a mobile phone (e.g., an iPhone or a mobile phone executing an Android operating system), a web appliance, a network router, a network switch or a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit 1016 (e.g., a disk drive unit), a signal generation device 1018 (e.g., a speaker), and a network interface device 1020.

The storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding, or carrying data structures utilized by or associated with such instructions. The term "machine-readable medium" shall accordingly be taken to include, but not be limited to, solid-state memories and optical and magnetic media Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Furthermore, the machine-readable medium 1022 is non-transitory in that it does not embody a propagating signal. However, labeling the tangible machine-readable medium 1022 as "non-transitory" should not be construed to mean that the medium 1022 is incapable of movement—the medium 1022 should be considered as being transportable from one physical location to another. Additionally, since the machine-readable medium 1022 is tangible, the medium 1022 may be considered to be a machine-readable device.

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include LANs, WANs, the Internet, mobile telephone networks, plain old telephone service (POTS) networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1026 may be one of the networks 114.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of example embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories; and
   a set of instructions incorporated into the one or more computer memories, the set of instructions configuring the one or more computer processors to perform operations comprising:
   receiving a metric from a computing device associated with an entity, the metric comprising a summary flag;
   adding a custom field to a summary table corresponding to the metric;
   training a machine learning model based on historical raw data and historical values for the metric to identify patterns in the historical raw data that indicate a true or false value for the summary flag represented by the custom field;
   associating a handler for deriving a value from raw data as it is received with the custom field added to the summary table, the handler identifying the trained machine learning model and identifying inputs to the trained machine learning model;
   adding the handler to a set of handlers for processing the raw data;
   as the raw data is received from a data provider via an input channel, performing operations comprising:
     invoking the handler and providing at least a portion of the raw data as an input into the trained machine learning model associated with the handler to generate an output from the machine learning model, the output comprising a true or false value;
     determining a value for the summary flag based on the output of the machine learning model; and
     inserting the determined value for the summary flag into the custom field of the summary table; and
   providing access to the summary table as enriched data for use by an analysis tool.

2. The system of claim 1, wherein adding the handler to the set of handlers for processing the raw data comprises:
   accessing metadata that specifies a configuration for the set of handlers corresponding to a set of custom fields, the configuration including an order in which the set of handlers is to be executed and a type of each of the set of handlers that is to be used for each of the set of custom fields; and
   adding the handler to the set of handlers.

3. The system of claim 2, wherein the metadata specifies, for at least one handler of the set of handlers, one or more inputs from the raw data that comprise the at least the portion of the raw data that is to be fed into a machine-learning model associated with the at least one handler of the set of handlers.

4. The system of claim 3, wherein one of the custom fields is a type field, the one or more inputs include a display name and an entity name, and wherein the machine-learned model associated with the at least one of the set of handlers returns a value corresponding to the type field based on the display name and the entity name.

5. The system of claim 1, wherein the processing of the raw data as it is received from the data provider is performed in lieu of post-processing of the raw data after it is received.

6. The system of claim 1, wherein the summary table aggregates data that is stored in separate files pertaining to at least two of diversity, green, or risk information corresponding to an entity.

7. The system of claim 1, wherein the custom field corresponds to a rollup flag that signifies whether an entity has an attribute that satisfies a certification requirement.

8. The system of claim 1, wherein the handler is one of a set of handlers linked together sequentially, and wherein as the raw data is received from the data provider via the input channel, the operations further comprise invoking each other handler in the set of handlers to generate a result of invoking each handler and inserting the result of invoking each handler in a custom field associated with each handler.

9. The system of claim 1, wherein the metric is a diversity metric.

10. A method comprising:
    receiving a metric from a computing device associated with an entity, the metric comprising a summary flag;
    adding a custom field to a summary table corresponding to the metric;
    training a machine learning model based on historical raw data and historical values for the metric to identify patterns in the historical raw data that indicate a true or false value for the summary flag represented by the custom field;
    associating a handler for deriving a value from raw data as it is received with the custom field added to the summary table, the handler identifying the trained machine learning model and identifying inputs to the trained machine learning model;
    adding the handler to a set of handlers for processing the raw data;
    as the raw data is received from a data provider via an input channel, performing operations comprising:
      invoking the handler and providing at least a portion of the raw data as an input into the trained machine learning model associated with the handler to generate an output from the machine learning model, the output comprising a true or false value;

determining a value for the summary flag based on the output of the machine learning model; and inserting the determined value for the summary flag into the custom field of the summary table; and providing access to the summary table as enriched data for use by an analysis tool.

11. The method of claim 10, wherein adding the handler to the set of handlers for processing the raw data comprises:

accessing metadata that specifies a configuration for the set of handlers corresponding to a set of custom fields, the configuration including an order in which the set of handlers is to be executed and a type of each of the set of handlers that is to be used for each of the set of custom fields; and adding the handler to the set of handlers.

12. The method of claim 11, wherein the metadata specifies, for at least one handler of the set of handlers, one or more inputs from the raw data that comprise the at least the portion of the raw data that is to be fed into a machine-learning model associated with the at least one handler of the set of handlers.

13. The method of claim 12, wherein one of the custom fields is a type field, the one or more inputs include a display name and an entity name, and wherein the machine-learned model associated with the at least one of the set of handlers returns a value corresponding to the type field based on the display name and the entity name.

14. The method of claim 10, wherein the processing of the raw data as it is received from the data provider is performed in lieu of post-processing of the raw data after it is received.

15. The method of claim 10, wherein the summary table aggregates data that is stored in separate files pertaining to at least two of diversity, green, or risk information corresponding to an entity.

16. The method of claim 10, wherein the custom field corresponds to a rollup flag that signifies whether an entity has an attribute that satisfies a certification requirement.

17. A non-transitory machine-readable medium storing instructions that, when executed by one or more computer processors, cause the one or more computer processors to perform operations comprising:

receiving a metric from a computing device associated with an entity, the metric comprising a summary flag;

adding a custom field to a summary table corresponding to the metric;

training a machine learning model based on historical raw data and historical values for the metric to identify patterns in the historical raw data that indicate a true or false value for the summary flag represented by the custom field;

associating a handler for deriving a value from raw data as it is received with the custom field added to the summary table, the handler identifying the trained machine learning model and identifying inputs to the trained machine learning model;

adding the handler to a set of handlers for processing the raw data;

as the raw data is received from a data provider via an input channel, performing operations comprising:

invoking the handler and providing at least a portion of the raw data as an input into the trained machine learning model associated with the handler to generate an output from the machine learning model, the output comprising a true or false value;

determining a value for the summary flag based on the output of the machine learning model; and inserting the determined value for the summary flag into the custom field of the summary table; and providing access to the summary table as enriched data for use by an analysis tool.

18. The non-transitory machine-readable medium of claim 17, wherein adding the handler to the set of handlers for processing the raw data comprises:

accessing metadata that specifies a configuration for the set of handlers corresponding to a set of custom fields, the configuration including an order in which the set of handlers is to be executed and a type of each of the set of handlers that is to be used for each of the set of custom fields; and adding the handler to the set of handlers.

19. The non-transitory machine-readable medium of claim 18, wherein the metadata specifies, for at least one handler of the set of handlers, one or more inputs from the raw data that comprise the at least the portion of the raw data that is to be fed into a machine-learning model associated with the at least one handler of the set of handlers.

20. The non-transitory machine-readable medium of claim 17, wherein the summary table aggregates data that is stored in separate files pertaining to at least two of diversity, green, or risk information corresponding to the entity.

* * * * *